Jan. 11, 1955 A. ETIENNE 2,699,046
PROCESS FOR SEPARATING FLUID MIXTURES INTO
FRACTIONS OF DIFFERENT VOLATILITIES
Filed Jan. 23, 1948 7 Sheets-Sheet 1

INVENTOR:
ALFRED ETIENNE
By Young, Emery & Thompson

Fig. 4

Jan. 11, 1955  A. ETIENNE  2,699,046
PROCESS FOR SEPARATING FLUID MIXTURES INTO
FRACTIONS OF DIFFERENT VOLATILITIES
Filed Jan. 23, 1948  7 Sheets-Sheet 4

Fig. 5

INVENTOR:
ALFRED ETIENNE
By Young, Emery & Thompson
Attys.

Fig.6

United States Patent Office 2,699,046
Patented Jan. 11, 1955

2,699,046

PROCESS FOR SEPARATING FLUID MIXTURES INTO FRACTIONS OF DIFFERENT VOLATILITIES

Alfred Etienne, Paris, France, assignor to L'Air Liquide Societe Anonyme pour l'Etude et l'Exploitation des Procedes Georges Claude, Paris, France Application January 23, 1948, Serial No. 3,978

Claims priority, application France October 22, 1947

9 Claims. (Cl. 62—175.5)

This invention relates to a process which improves upon a known process for separating fluid mixtures into fractions of different volatilities by rectification, which known process will be hereinafter defined. In the statement of the same, it will be assumed, in the interests of simplicity, that the mixture to be separated contains only two constituents with different boiling temperatures, but the process is applicable to a mixture of constituents in any number, whether all of them are to be distributed between two higher and lower boiling fractions, or some of them are to be withdrawn at one or more intermediate places of the rectification column or columns in which the process is carried out.

The known process referred to is the following:

The mixture to be separated is entered into a rectification column operated under a relatively high pressure, a liquid mixture is withdrawn therefrom and expanded to a lower pressure. After being possibly rectified in a second column by the gas resulting from its vaporization, at least a part of it is vaporized in heat exchange with the gas, enriched in the lower boiling constituent, present at the top of the column under relatively high pressure, so as to simultaneously bring about the liquefaction of the gas, thus forming a washing liquid for the gas rising through the column. In fact, this heat exchange is generally performed in a condenser-vaporizer located at the top of the rectification column under relatively high pressure and similarly, when the liquid to be vaporized is rectified by the gas resulting from its vaporization, this last rectification is performed in a column topping the condenser-vaporizer, so that both columns lie one above the other.

In this process, as in all processes for separating fluid mixtures using rectification columns, a liquid relatively rich in the lower boiling constituent flows downwardly from the top of a rectification column, thereby washing the ascending gas. This liquid retains the higher boiling constituent contained in the rising gas, thereby becoming richer therein as it flows downwards. As a rule, the minimum liquid amount necessary at each level of the column to retain the largest possible portion of the higher boiling constituent contained in the ascending gas increases when lower and lower levels are considered. Therefore, when the highest amount of the washing liquid necessary at any level of the column is admitted at the top thereof, the quantity of liquid relatively rich in the lower boiling constituent which flows down from the top is larger than the one necessary in the upper portion of the column to drive down the higher boiling constituent. As this washing liquid is a separated product, the separation of which has required power, it is more valuable than the liquid poorer in the lower boiling constituent into which it is gradually transformed when flowing downwardly through the column. The process results therefore in a dissipation of energy. Such a dissipation is also met with for a similar reason when the above mentioned minimum amount of washing liquid decreases from above downwards. Such is especially the case with ethyl alcohol-water mixtures.

The main object of my invention is to provide a power economy, in a separation carried out according to the above defined general process, by lowering the indicated dissipation of energy.

A further object is to obtain relatively to known methods, a more efficient and sharper separation without any extra power expense.

These objects are attained, according to my invention, by the following steps.

In a rectification column, a descending liquid mixture is passed in a conventional manner in counter-current to a gaseous ascending mixture. In a region between the upper and lower portions of said rectification column, a fluid derived from this column and under a pressure distinct from the pressure therein is brought in indirect contact with at least one of said mixtures, to at least partly change the physical state of the mentioned fluid. At least a portion of this fluid as it results from the said indirect contact is then rectified in a distinct column operated under a pressure distinct from the pressure in the first named rectification column, and a fluid including at least one of the products of the last named rectification is used in the operation of the first column.

As it appears from this statement of my invention, the mentioned indirect contact takes place between, on one hand the mentioned fluid, and on the other hand either the ascending gas, which is so partly liquefied, or the descending liquid which is so partly vaporized. The mentioned fluid is initially, in the first case, a liquid which is vaporized by the indirect contact, and in the second case, a gas which is liquefied by the indirect contact.

The first embodiment is the most frequently appliable, as corresponding to the case when the minimum necessary amount of washing liquid is greater at relatively lower levels of the column than at the top of the same. The vaporization of the liquid making up the mentioned fluid causes indeed a partial condensation of the ascending gas which augments the amount of the descending liquid in the lower portion of the column.

The second embodiment corresponds to the reverse case, when a greater amount of washing liquid is necessary in the upper portion of the column. The condensation of the gas making up the mentioned fluid causes then a partial vaporization of the descending liquid, which augments in the upper portion of the column the gas-to-liquid ratio.

Limiting in the interests of clarity, the following explanations to the first case, when the mentioned fluid is initially a liquid, this liquid is more or less vaporized through the mentioned indirect contact. The resulting vapour or gas is then rectified in an auxiliary column, and at least one of the products of this last rectification is used in the operation of the first rectification column.

The power spared by this invention may, if desired, be utilized to improve the separation, that is, for increasing the purity of the separated constituents, or to obtain them at least in part, in a liquid condition without extra power expense.

It is to be noted that the terminology will be simplified as follows in the detailed description of the invention.

(1) The higher boiling and the lower boiling fractions into which the processed fluid mixture is separated will be respectively termed "high boiling constituent", and "low boiling constituent"; they will be termed "high boiling gas" and "low boiling gas" when considered in the gaseous state, and "high boiling liquid" and "low boiling liquid" when considered in the liquid state.

(2) Any condenser-vaporizer in which a heat exchange results from the liquefaction of a gas and the contemporaneous vaporization of a liquid, both in indirect contact with each other, will be termed "condenser" or "vaporizer" respectively, when only the liquefaction or the vaporization is considered.

(3) A condenser-vaporizer will be termed "intermediate condenser-vaporizer," "upper condenser-vaporizer" or "lower condenser-vaporizer" respectively, when the gas or liquid respectively condensed or vaporized therein flows in an intermediate place, the top, or the bottom of a rectification column.

Moreover, the essential features of this invention may be performed according to various arrangements indicated hereafter:

A. *Immediate vaporization.*—A liquid mixture withdrawn from the main column is led, as such, to a device wherein it is at least partly vaporized by indirect contact with gas ascending in the column.

B. *Vaporization after rectification.*—Before being vaporized, the withdrawn liquid mixture is rectified in the auxiliary column by the gas resulting from its vaporization.

C. *Cooling of the auxiliary column by direct contact.*— A portion of a relatively low boiling liquid formed in the upper part of the main rectification column is withdrawn therefrom, expanded to a lower pressure and delivered to the top of the auxiliary column.

D. *Cooling of the auxiliary column by indirect contact.*—The auxiliary column is provided with an upper condenser vaporizer wherein liquid formed in the process is vaporized at a pressure lower than the pressure in this column.

E. *Several indirect contacts.*—The mentioned single indirect contact of a liquid derived from the main column with gas ascending in the same, is replaced by two or more similar indirect contacts taking place at different levels of the column.

F. *Several auxiliary columns.*—When, according to arrangement D, two (or more) indirect contacts are performed in the main column, several auxiliary columns may be arranged each of them retifying the gas resulting from the indirect contact of a liquid with gas ascending in the main column. Each of the intermediate condensers-vaporizers wherein the said indirect contacts are performed may be used as the upper or lower condenser of one of the auxiliary columns.

Several exemplary embodiments of this invention will now be described, with corresponding figures. Corresponding elements are in all figures referenced by the same number. The meaning of each reference is indicated only about the first figure in which it appears.

The drawings illustrating some embodiments of my invention are described hereafter in greater detail.

Figure 1:
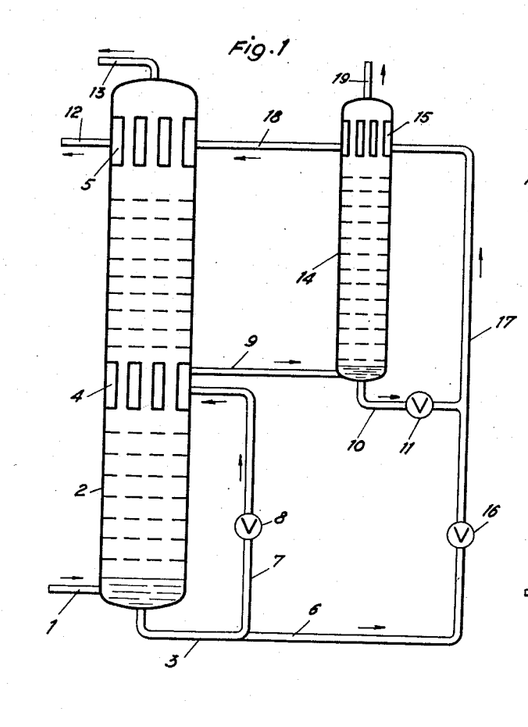
Fig. 1 is a schematic view of an apparatus for carrying out the present invention in which the mixture to be separated enters the main column in a gaseous state, and the cooling of the upper end of the auxiliary column is performed according to arrangement D (cooling by indirect contact).

According to Fig. 1, air compressed to about 3 atmospheres is admitted through a pipe 1 to the lower part of a rectification column 2, comprising an intermediate condenser-vaporizer 4 and an upper condenser-vaporizer 5. A liquid mixture with about 45% oxygen and 55% nitrogen is collected at the bottom of the column. This liquid is withdrawn from the column by a pipe 3, then divided into two portions. The first one, for example about the third part, is derived through a pipe 7, expanded in a valve 8 to about 2 atmospheres absolute, and led to a vaporizer 4. The gas formed in the same passes through a pipe 9 to the lower part of a rectification column 14, which comprises an upper condenser-vaporizer 15. The portion of the liquid collected at the bottom of column 2 which does not flow through pipe 7 flows through a pipe 6 and is expanded to atmospheric pressure in a valve 16. The oxygen-nitrogen liquid mixture leaving column 14 at the bottom of the same flows through a pipe 10 and is expanded to atmospheric pressure in a valve 11. Both liquids are combined and the mixture thus formed is passed through a pipe 17 to vaporizer 15 wherein it partly vaporizes. The liquid-gas mixture formed is led through a pipe 18 to vaporizer 5, in which it is fully vaporized. The following products are collected: through the pipe 13, nitrogen under a pressure of about 3 atmospheres absolute, which may be further expanded with performance of external work and of cold; through the pipe 19, nitrogen under a pressure of about 2 atmospheres absolute, which may be similarly expanded, through the pipe 12, an oxygen-nitrogen mixture under atmospheric pressure.

Figure 2:
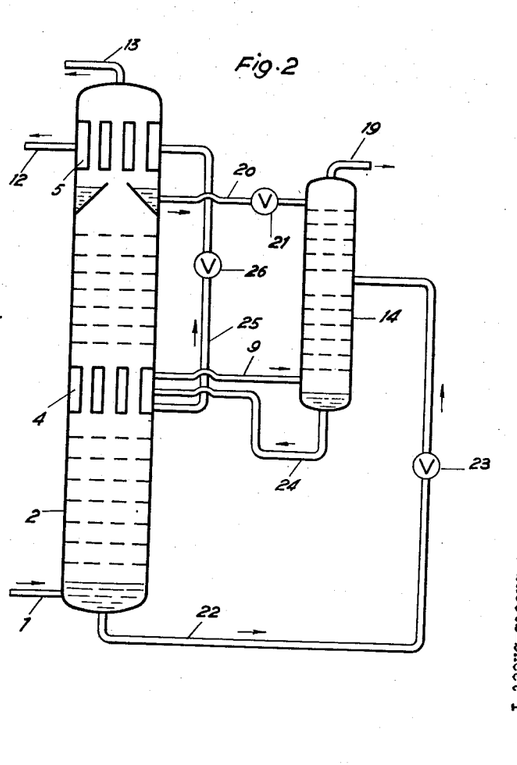
Fig. 2 is a similar view of a modified apparatus in which are combined the arrangements: A (immediate vaporization), B (vaporization after rectification) and C (cooling of the auxiliary column by direct contact).

According to Fig. 2, the liquid oxygen-nitrogen mixture collected at the bottom of column 2 is withdrawn therefrom through a pipe 22, then expanded to a lower pressure in a valve 23 and delivered to an intermediate place of column 14. The oxygen-nitrogen mixture collected at the bottom of the same is led to vaporizer 4 through a pipe 24, the gas formed in vaporizer 4 is passed to the lower part of column 14 through a pipe 9, whereas the liquid not vaporized is conducted to vaporizer 5 through a pipe 25 provided with a pressure relief valve 26. A portion of the liquid nitrogen formed at the top of column 2 is withdrawn therefrom through a pipe 20, expanded by a valve 21 and delivered to the top of the column 14.

The embodiment shown by Fig. 2 is appliable to the separation of coke oven gas already stripped of its heavier components and consisting chiefly of hydrogen, nitrogen, carbon monoxide and methane. Such a gas may be considered as a mixture of methane and of a lower boiling constituent.

The mixture after having been cooled about to the dew point in a conventional device, not shown, is introduced into column 2 under a pressure of about 15 atmospheres. The liquid collected at the bottom of the column consists chiefly of methane, with lower amounts of carbon monoxide, nitrogen and hydrogen, whereas liquid withdrawn from column 2 through pipe 20 is substantially a mixture of carbon monoxide, nitrogen and hydrogen. The pressure in column 14 is about 5 atmospheres absolute. The liquid collected at the bottom of column 14 is essentially methane, with a little amount of carbon monoxide, but substantially free from nitrogen and hydrogen. The portion of this liquid which does not vaporize in vaporizer 4 is still poorer in carbon monoxide. Thus, methane containing only a little carbon monoxide is collected through pipe 12. A mixture of carbon monoxide, nitrogen and hydrogen, substantially free from methane is withdrawn through pipe 19. Hydrogen, which contains substantial quantities of nitrogen and carbon monoxide, but which may be further, if desired, freed from these constituents by known processes is collected through pipe 13.

As is obvious from the foregoing, condenser-vaporizer 4 and rectification column 14 make it possible to separate, without additional power outlay and without impairing the separation of coke oven gas in column 2, the several component mixtures collected at the bottom of this column into a fraction consisting chiefly of methane and a methane free fraction.

Figure 3:
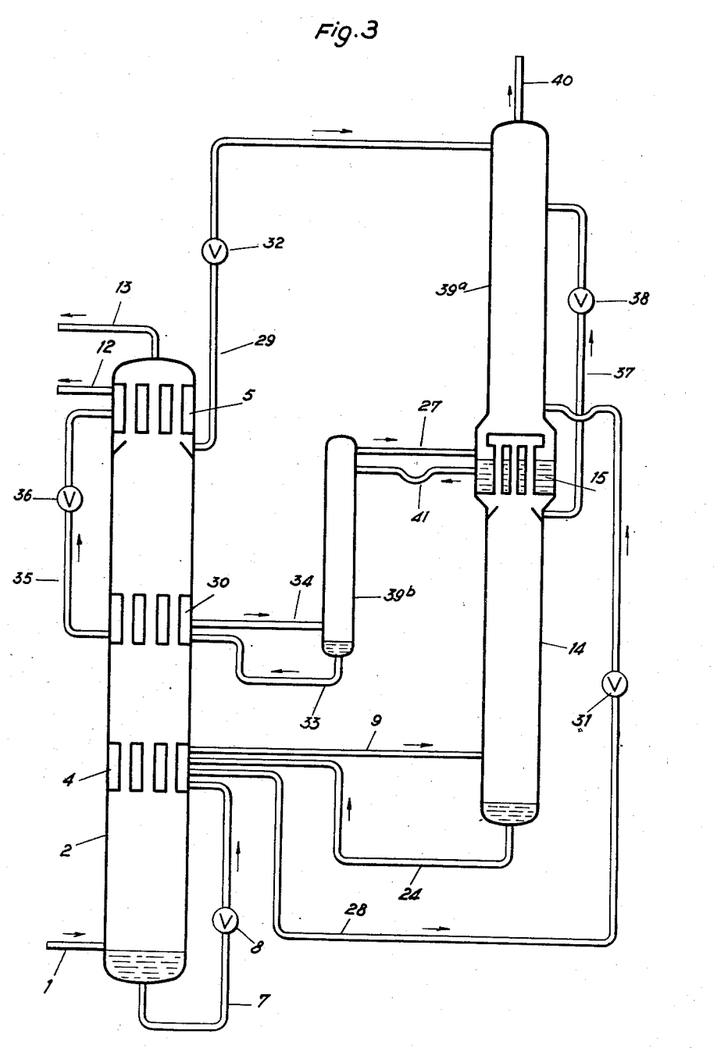
Fig. 3 is a similar view of another modified apparatus in which are combined the arrangements: D (auxiliary column cooled by indirect contact) and F (several auxiliary columns).

In the embodiment shown by Fig. 3, the air which enters column 2 at the lower part of the same through pipe 1 is under a pressure of about 2.5 atmospheres absolute. In column 2 are arranged two intermediate condensers-vaporizers 4 and 30. The liquid oxygen-nitrogen mixture withdrawn from column 2 by pipe 7 is expanded in valve 8 to about 2 atmospheres absolute. The upper condenser-vaporizer 15 of column 14 makes up the lower condenser-vaporizer of a further auxiliary rectification column 39a operated under a pressure of about 1.1 atmosphere absolute. The liquid not vaporized in vaporizer 4 leaves the same through a pipe 28, is expanded through a valve 31 and enters column 39a slightly above vaporizer 15.

The liquid issuing from the same is passed to vaporizer 30 through a pipe 41, an additional column 39b and a pipe 33. The gas resulting from the vaporization in vaporizer 30 flows back therefrom into column 39a through a pipe 34, column 39b, a pipe 27, whereas the non-vaporized liquid is conveyed to the upper vaporizer 5 through a pipe 35 provided with a throttle valve 36. A portion of the nitrogen condensed at the top of column 2 through operation of condenser 5 is delivered to the top of column 39a through a pipe 29 provided with a throttle valve 32. A portion of the nitrogen-rich liquid formed at the top of column 14 by condenser 15 is similarly delivered to column 39a near the top thereof through a pipe 37 bearing a throttle valve 38. The following products are removed: by pipe 12, an oxygen-nitrogen mixture with about 75% of oxygen, under a pressure of about 0.6 atmosphere absolute, that is by creating a partial vacuum; by pipe 13, nitrogen under 2.5 atmospheres absolute, which may be cold expanded; by pipe 40, nitrogen under 1.1 atmosphere absolute.

Figure 4:
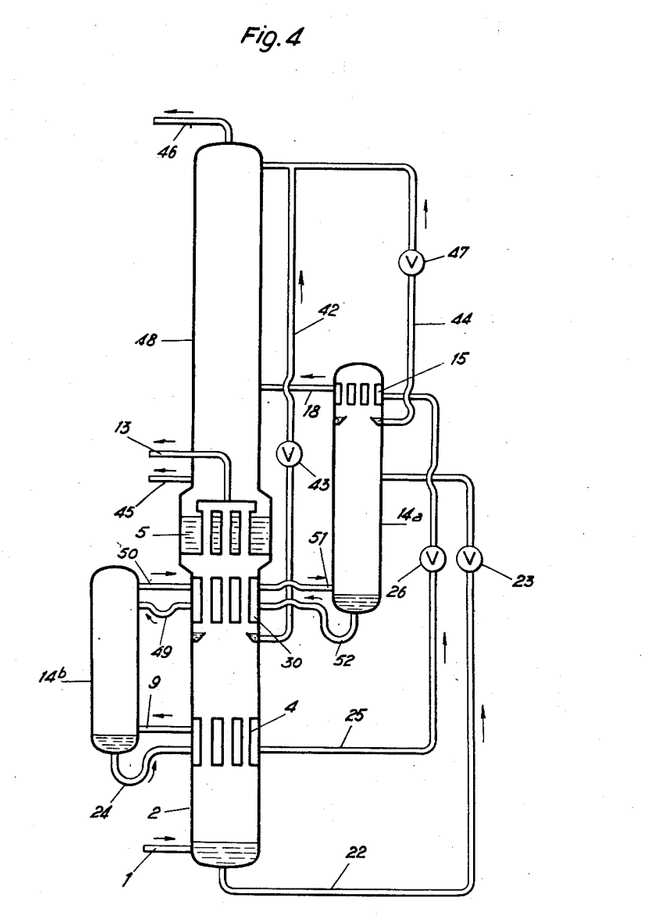
Fig. 4 is a similar view of yet another modified apparatus in which are combined the arrangements: A (immediate vaporization), B (vaporization after rectification), D (auxiliary column cooled by indirect contact) and E (several indirect contacts).

In the embodiment shown by Fig. 4, the main rectification column includes a low pressure rectification zone 48 to different levels of which are delivered: firstly a liquid gas mixture resulting from the parital vaporization of the liquid utilized for cooling by indirect contact the upper end of the auxiliary column, secondly a portion of the liquid formed at the upper end of the auxiliary column, and thirdly a portion of the low boiling liquid formed at the top of the high pressure zone 2 of the main rectification column.

The upper condenser-vaporizer 5 of high pressure column 2 is at the same time the lower condenser-vaporizer of a low pressure column 48 making up the above mentioned low pressure zone. A portion of the liquid nitrogen formed in condenser 5 is delivered in known manner to the top of column 48 by a pipe 42 bearing an expansion valve 43. A portion of the liquid nitrogen condensed at the top of auxiliary column 14a is similarly delivered through a pipe 44, provided with an expansion valve 47 to the top of column 48. The liquid-gas mixture resulting from the partial vaporization of the oxygen-nitrogen liquid mixture in vaporizer 15 is led to an intermediate place of column 48 through a pipe 18. Column 14 is divided into two sections 14a and 14b separated from each other by a condenser-vaporizer 30 placed inside high pressure column 2 below upper condenser-vaporizer 5. The liquid coming from the upper section 14a is led to vaporizer 30 by a pipe 52 and the portion of the liquid which does not vaporize therein is passed to the section 14b through a pipe 49. The gas coming from that section is passed to the section 14a through a pipe 50, vaporizer 30 and a pipe 51.

Gaseous nitrogen under pressure is collected through pipe 13, oxygen of the desired purity through a pipe 45 and nitrogen under atmospheric pressure through a pipe 46.

The addition, according to this invention, of the intermediate condenser-vaporizer 4 and of the auxiliary column 14a—14b to the conventional two-column apparatus 2—48 results, either in a greater available amount of nitrogen to be expanded so as to produce cold, or in a larger quantity of washing liquid. Consequently purer nitrogen and an improved oxygen output, may be obtained with the same consumption.

Figure 5:
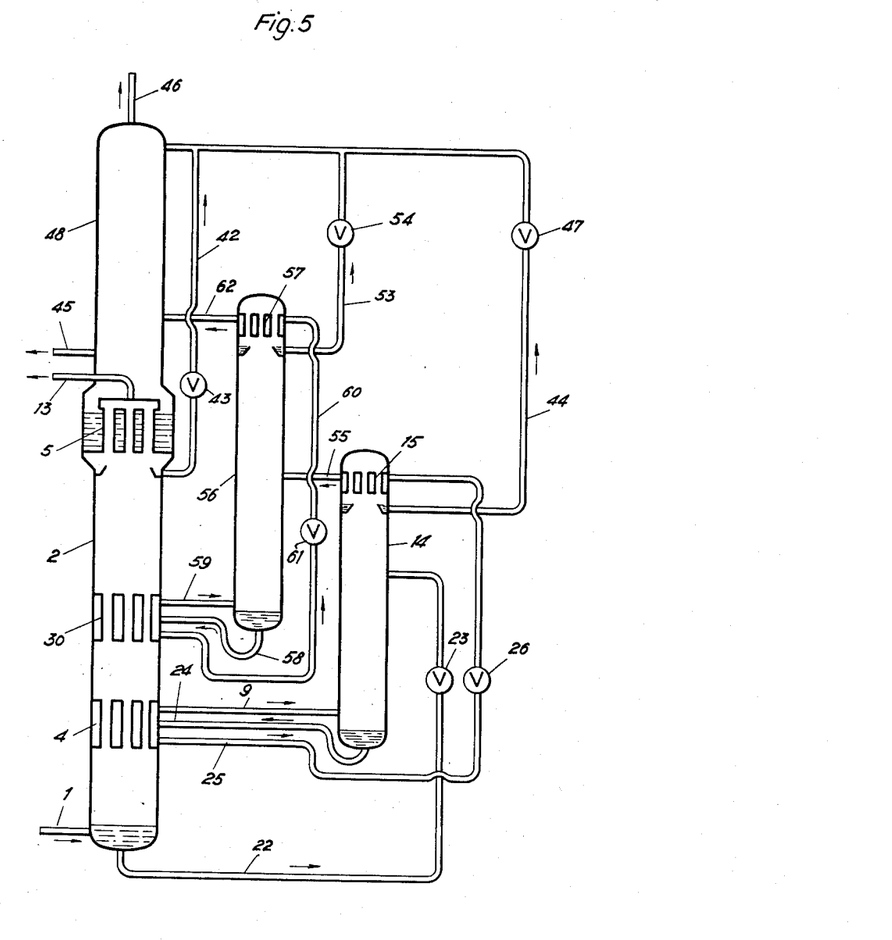
Fig. 5 is a similar view of still another modified apparatus in which are combined the arrangements: B (vaporization after rectification), D (cooling of the auxiliary column by indirect contact) and F (several auxiliary columns), which is here carried out in a special manner.

Figure 5 illustrates an embodiment in which the gas ascending in the main column is subjected to two successive indirect contacts, and in which two auxiliary columns are used.

In this embodiment, a liquid derived from the main column is partly vaporized through a first indirect contact. Each of the respective vaporized and non-vaporized portions is rectified in a distinct auxiliary column. Each auxiliary column has for its reboiler one of the two condensers-vaporizers in which are performed the mentioned indirect contacts.

The liquid which has not vaporized in the first vaporizer is partly expanded through a valve 26 and led to the upper condenser-vaporizer 15 of the first auxiliary column 14. The liquid-gas mixture leaving the condenser-vaporizer 15 is conducted through a pipe 55 to an intermediate place of a second auxiliary column 56 provided with an upper condenser-vaporizer 57. The oxygen-enriched liquid collected at the bottom of this column is introduced through a pipe 58 into a second intermediate vaporizer 30 arranged in column 2 above vaporizer 4. Gas which is formed in vaporizer 30 is re-admitted to the bottom of column 56 by a pipe 59, while the liquid not vaporized is passed through a pipe 60, provided with a throttle valve 61, to the upper condenser-vaporizer 57 of column 56. A portion of the liquid vaporizes therein and the formed liquid-gas mixture is delivered through a pipe 62 to an intermediate place of the low-pressure column 48. A portion of the liquid nitrogen condensed at the top of column 56 is delivered through a pipe 53 and a pressure relief valve 54 to the top of low-pressure column 48.

Figure 6:
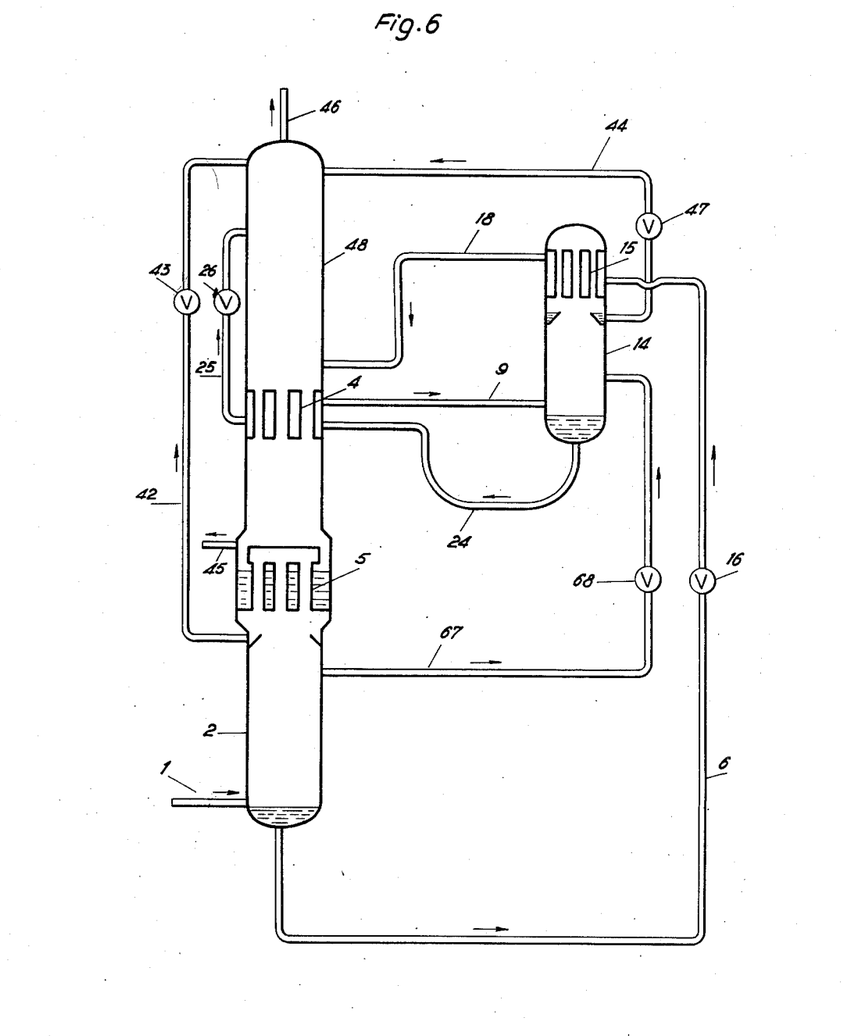
Fig. 6 is a similar view of a further modified apparatus in which are combined the arrangements: A (immediate vaporization), B (vaporization after rectification) and D (cooling of the auxiliary column by indirect contact), with moreover a special arrangement which will be explained hereafter.

Figure 6 shows an embodiment of this invention, the purpose of which is to recover, in the separation of a three component mixture, the low boiling constituent substantially free from the middle boiling one. It is therefore specially applicable to the processing of air for the recovery of argon-free nitrogen.

The shown apparatus comprises a column 2 under a pressure of about 5 atmospheres absolute, a column 48 under atmospheric pressure in heat exchange with column 2 through a condenser-vaporizer 5 and an auxiliary column 14 under an intermediate pressure, provided with an upper condenser-vaporizer 15 and connected at its lower part with an intermediate condenser-vaporizer 4 arranged in low pressure column 48. Liquid nitrogen with about 0.4% argon is withdrawn from the high pressure column near its top and delivered through a pipe 67 and a pressure relief valve 68 to an intermediate place of auxiliary column 14. The liquid collected at the bottom of the same is passed through a pipe 24 to the intermediate vaporizer 4, in which it partially vaporizes. The gas formed is passed back to the lower part of column 14 through a pipe 9, whereas the liquid not vaporized is delivered through a pipe 25 provided with a throttle valve 26 to a higher place of low pressure column 48. The liquid mixture collected at the lower part of column 2 is withdrawn therefrom through pipe 6, is expanded in a valve 16 to atmospheric pressure, partly vaporized in a vaporizer 15 located at the top of column 14 and delivered through a pipe 18 to the low pressure column 48. Both nitrogen liquids formed in condenser 5 and in condenser 15 are substantially argon free. A portion of the first one is derived through a pipe 42 and expanded in a valve 43; similarly a portion of the second one is derived through a pipe 44 and expanded in a valve 47. Both portions are delivered to the top of low pressure column 48. Substantially argon free nitrogen is removed through a pipe 46, the whole argon being withdrawn with the oxygen through a pipe 45.

Figure 7:
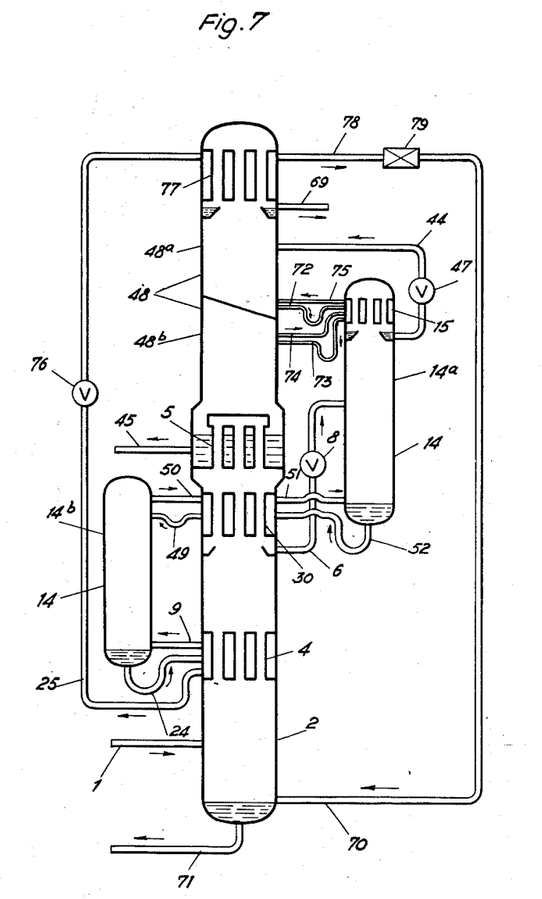
Fig. 7 is a similar view of a still further modified apparatus in which are combined the arrangements: A (immediate vaporization), B (vaporization after rectification) and D (cooling of the auxiliary column by indirect contact), with moreover a special arrangement which will be explained hereafter.

Figure 7 shows at the same time both above mentioned utilizations of the indirect contact according to this invention, i. e. on one hand to cause the partial condensation of an ascending gas, and on the other hand to cause the partial vaporization of a descending liquid. These corresponding indirect contacts take place respectively in the higher pressure zone and in the lower pressure zone of a conventional double rectification column.

An ethyl alcohol-water mixture under a pressure of about 1.8 atmosphere absolute is delivered in the liquid state through a pipe 1 to an intermediate place of a rectification column 2, which is heated at its lower end by steam admitted through a pipe 70. The mixture is separated in column 2 into water, which is removed in the liquid state from the bottom of the column through a pipe 71, and a gaseous alcohol-water mixture which is condensed at the top of column 2 in condensers 5 and 30. A portion of the condensed mixture is withdrawn through a pipe 6, expanded to a pressure of about 1.4 atmospheres absolute through a valve 8 and delivered to an intermediate place of the upper section 14a of a rectification column 14, which is divided into two sections 14a and 14b separated from each other by a condenser-vaporizer 30. Column 14 is in heat exchange with column 2, through both this condenser-vaporizer 30 and condenser-vaporizer 4. It is moreover in heat exchange through a condenser-vaporizer 15 with column 48 under atmospheric pressure at an intermediate place of the same, which column is, to this end, divided into an upper section 48a and a lower section 48b. The liquid having flown down through section 48a is led to vaporizer 15 through a pipe 72. The liquid not vaporized in 15 is passed to section 48b through a pipe 73, while gas flowing up in section 48b is passed to section 48a through pipe 74, vaporizer 15 and pipe 75.

A portion of the alcohol-enriched liquid mixture condensed at the top of column 14a is introduced into section 48a through a pipe 44 provided with an expansion valve 47. Section 48a is topped with an upper condenser-vaporizer 77 in which alcohol condenses. A portion thereof, making up the final separated product is withdrawn therefrom through a pipe 69. Water derived from condenser-vaporizer 4 by pipe 25 is vaporized in vaporizer 77 under a pressure of about 0.35 atmosphere absolute, that is, by creating a partial vacuum. Steam formed in vaporizer 77 empties therefrom through a pipe 78 and is compressed in a compressor 79. The resulting compressed steam is conducted to the bottom of column 2 through a pipe 70. Water is removed through a pipe 45 from the bottom of column 48.

Figure 8:
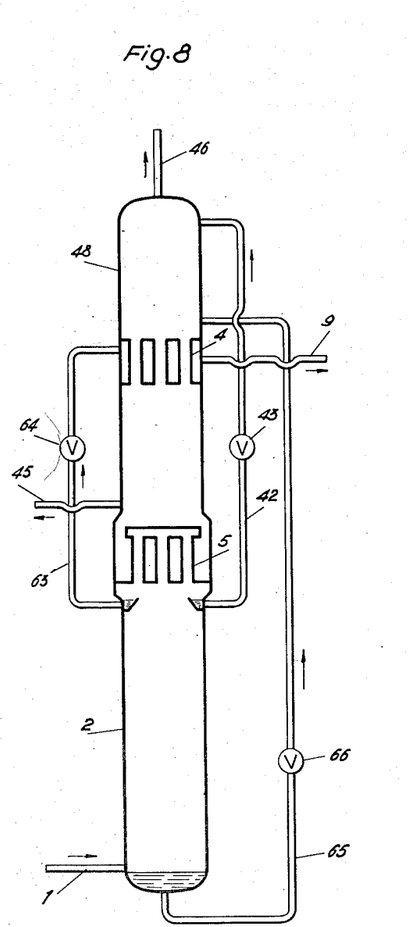
Fig. 8 is a modified apparatus in which are combined the arrangements: B (vaporization after rectification) and D (cooling of the auxiliary column by indirect contact).

Fig. 8 shows an embodiment using a conventional double pressure column, wherein atmospheric air is rectified. The indirect contact takes place in the lower pressure zone, and is performed between gas ascending in the same and liquid nitrogen derived from the top of the higher pressure zone, which nitrogen, being substantially pure is not further rectified.

The oxygen-nitrogen liquid mixture collected at the bottom of higher pressure column 2 is delivered to an intermediate place of lower pressure column 48 through a pipe 65 bearing a throttle valve 66. A portion of the liquid nitrogen formed in the condenser 5 is delivered to the top of column 48 through a pipe 42 provided with a throttle valve 43. Another portion of the same liquid nitrogen is derived through a pipe 63, expanded to about 3 atmospheres absolute in a valve 64 and vaporized in the intermediate vaporizer 4. It is then removed through a pipe 9.

The operative steps of the separation of fluid mixtures which do not fall within the scope of this invention have not been described in detail. In every particular case, those skilled in the art will combine these known steps with those essential to the invention.

I claim:

1. A process of separating by rectification a fluid mixture into fractions of different volatilities, which comprises passing a descending liquid mixture in counter-current to a gaseous ascending mixture in a rectification column, then immediately bringing in indirect contact with at least one of said mixtures, at a region between the upper and lower portions of said rectification column, a fluid under a pressure distinct from the pressure in the rectification column to at least partly change the physical state of this fluid, said fluid being derived from the same rectification column, further passing the descending liquid mixture in counter-current with the ascending gaseous mixture in the same rectification column, and rectifying under a pressure distinct from the pressure in the rectification column at least a portion of the fluid which was brought into indirect contact with said mixture, and utilizing a fluid including at least one of the products of the last named rectification in the operation of the first named rectification column.

2. A process according to claim 1 wherein the first mentioned fluid is a liquid under a lower pressure than the pressure in the rectification column.

3. A process according to claim 2 in which the liquid to be brought in indirect contact with the gaseous mixture is a product of a liquid used in an auxiliary column to rectify the gas generated by the indirect contact of said liquid with the gaseous mixture.

4. A process according to claim 1 in which the first mentioned fluid is a liquid under a lower pressure than the pressure in the rectification column, and in which the liquid derived from the rectification column is put twice in succession in indirect contact with the gaseous mixture under decreasing pressures lower than the pressure in the rectification column, this liquid being partially vaporized through each of these successive indirect contacts, and the two gases resulting from these partial vaporizations are respectively rectified in two auxiliary columns, cooled at their upper ends by heat exchange with liquids formed in the process.

5. A process according to claim 4 in which the second auxiliary column is in heat exchange with the first one by means of a condenser-vaporizer, and firstly the portion of the liquid not vaporized by the first indirect contact, and secondly a portion of the liquid formed in the condenser of the first auxiliary column, are delivered to this second auxiliary column at different levels thereof.

6. A process according to claim 5 in which the liquid which leaves the second auxiliary column at its bottom and will be vaporized by indirect contact with the high pressure gas derived from the high pressure rectification column is rectified by the gas resulting from its vaporization.

7. A process according to claim 1 in which the first mentioned fluid is a liquid under a lower pressure than the pressure in the rectification column, the liquid to be brought in indirect contact with the gaseous mixture is a product of a liquid used in an auxiliary column to rectify the gas generated by the indirect contact of said liquid with the gaseous mixture and in which the fluid mixture to be separated into its constituents is delivered in the gaseous state to the lower part of a relatively high pressure rectification column, a liquid mixture is withdrawn from the column at the lower part thereof and expanded to a middle pressure, from this liquid are derived firstly the liquid to be brought in indirect contact with the gaseous mixture and secondly a liquid which is expanded to a low pressure and used in the separation process, said liquid mixture is partially vaporized under the middle pressure after it has been rectified by the gas resulting from its vaporization, the portion not vaporized being separated from the vaporized portion, the upper end of the auxiliary column is cooled by indirect contact with said unvaporized portion, which is thereby partially vaporized, and the liquid-gas mixture resulting from said partial vaporization, a portion of the liquid formed at the upper end of said auxiliary column and a portion of the low-boiling liquid formed at the top of the high pressure column are delivered to different levels of a low-pressure rectification column, the lower part of which is in indirect contact with the upper part of the high pressure rectification column.

8. A process according to claim 1 in which the first mentioned fluid is a liquid under a lower pressure than the pressure in the rectification column, and in which the rectification column is made up with two columns operated respectively at higher and lower pressures and in mutual heat exchange, which process comprises bringing in indirect contact with a gaseous mixture ascending in the higher pressure column a liquid derived from said column and expanded to a middle pressure, rectifying the gas resulting from the vaporization of last said liquid by the mentioned indirect contact in an auxiliary column operated under the middle pressure and cooled at its upper end by indirect contact with liquid derived from the lower pressure column, withdrawing from the auxiliary column a portion of the liquid formed at the upper end thereof, expanding it to the lower pressure and delivering it to the lower pressure column.

9. A process according to claim 8 in which the liquid from rectification under the middle pressure is passed in indirect contact with gas derived from the higher pressure column at at least two different levels thereof.

References Cited in the file of this patent

UNITED STATES PATENTS

| Number | Name | Date |
| --- | --- | --- |
| 1,594,336 | Mewes et al. | July 27, 1926 |
| 1,878,123 | Etienne | Sept. 20, 1932 |
| 2,040,107 | Schlitt | May 12, 1936 |
| 2,122,238 | Pollitzer | June 28, 1938 |
| 2,261,927 | Moore et al. | Nov. 4, 1941 |
| 2,280,383 | De Baufre | Apr. 21, 1942 |

FOREIGN PATENTS

| Number | Country | Date |
| --- | --- | --- |
| 439,260 | Germany | Jan. 11, 1927 |